(No Model.)
W. ONDERDONK.
PREPARING CEREALS.
No. 517,479. Patented Apr. 3, 1894.
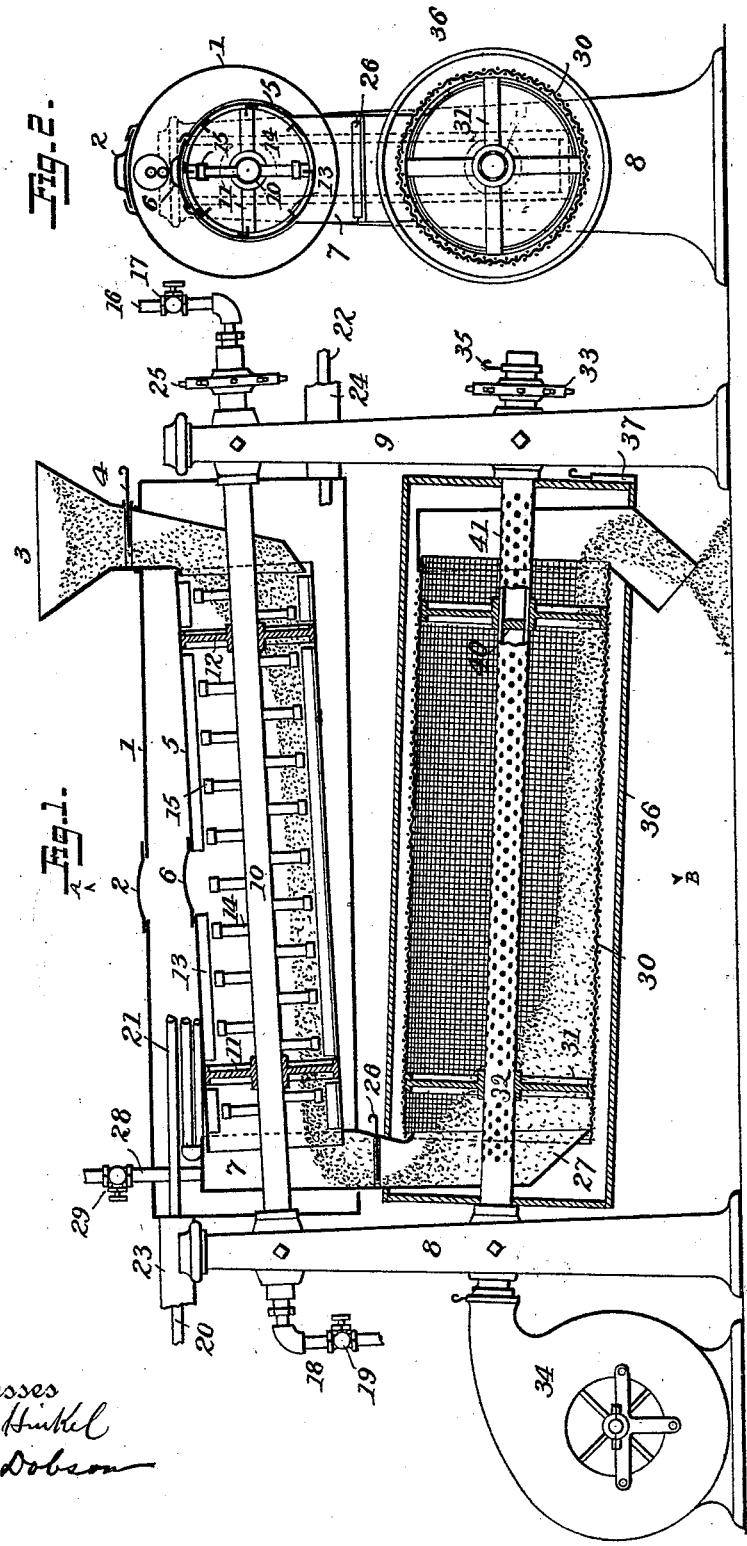
Witnesses
Inventor
W. Onderdonk
By
Foster Freeman
Attorneys

UNITED STATES PATENT OFFICE.

WILLIAM ONDERDONK, OF NEW YORK, N. Y.

PREPARING CEREALS.

SPECIFICATION forming part of Letters Patent No. 517,479, dated April 3, 1894.

Application filed March 31, 1893. Serial No. 468,453. (No model.)

*To all whom it may concern:*

Be it known that I, WILLIAM ONDERDONK, a citizen of the United States, residing in the city, county, and State of New York, have invented certain new and useful Improvements in Preparing Cereals, of which the following is a specification.

My invention relates to means for preparing or cooking cereals for family use, and it has for its object to provide an improved apparatus whereby various and different kinds of cereals may be roasted and partially cooked, ready to be sold in proper quantities, when the cooking can be completed by the user, and to these ends, my invention consists in the apparatus substantially as hereinafter more particularly pointed out.

In the accompanying drawings, I have shown the preferred embodiment of the apparatus for carrying out my invention, in which—

Figure 1, is a longitudinal vertical section; and Fig. 2, is a transverse vertical section on the line A—B, Fig. 1.

Heretofore in preparing cereals for table use, it has been common to subject them to what may be generally termed a steaming process, in which they may be partially cooked; but in order to properly prepare them for use, it requires a long and tedious subsequent cooking, and more than that, the steaming process leaves the cereals in an undesirable condition, in that, more or less moisture is absorbed by the cereals. In my improved process, on the contrary, I treat the cereals to what may be generally termed a roasting process, in contradistinction to the steaming process, and in doing this I subject the cereals to a high degree of dry heat without bringing them in contact with any steam or moisture, but on the contrary, driving off from the cereals or grain whatever moisture they may contain. More than that, in subjecting cereals to this high degree of heat, the character of the grain is changed, in that the starch is converted into dextrine and a further advantage is that any animal germs with which the grains are impregnated, are destroyed, and I am thereby enabled to produce an improved cereal product which is pure and wholesome as a food, which may be properly prepared and completely cooked in a very short space, and in which the materials are in the most desirable condition to be easily digested.

In carrying out my invention, I may make use of different cereals, preferably in the form of groats, the grain having previously been hulled and cleaned, so that the material is practically pure, containing the desirable portions only of the grain. These groats are then submitted to the action of dry heat at a temperature sufficient to drive off any moisture contained in the groats, and to change to a greater or less degree the starchy portions of the grain to dextrine or saccharine matter, and to accomplish this I preferably subject the groats to a temperature of about 350° Fahrenheit, although this exact degree is not necessary, it being sufficient to heat them sufficiently to accomplish the results desired throughout the body or mass of the grain. This results in what I term "roasting" the grain. The grain is then subjected to currents of cold air or otherwise rapidly cooled, and all dust or particles driven off, so that the resulting product is clean, pure and thoroughly roasted. In this condition, it can be rolled or ground and properly packed for convenience of handling and selling, and the product is capable of being completely and thoroughly prepared for consumption by subsequent cooking in the usual way, in a very short period of time.

In carrying out my process by the mechanism shown, I make use of a roaster apparatus, embodying an outer case 1, which may be and preferably is made of sheet or boiler-plate iron, and this may be provided with a man-hole 2, in its top, for convenience of access to the interior of the case. While this case may be of various forms, I find it most convenient to make it in the form of a cylinder or drum, as indicated in the drawings, and at one end I provide a suitable hopper or feeding device 3, which may be provided with a gate 4, or other appliance for controlling the delivery of the grain to the roasting apparatus hereinafter to be described.

Arranged within the outer case is an inner case 5, and this may also be and preferably is made of sheet or boiler iron, and may have the usual man-hole 6. The ends of this case are open, and one end, as the inlet end, is closed by the hopper 3 before referred to, while the other end is closed by the delivery chute 7, and this hopper and chute are also made of metal, to properly withstand the high degree of heat to which they are subjected.

In order to support the outer and inner cases I provide suitable standards 8 and 9, and supported in these standards is a hollow shaft or pipe 10, arranged to rotate in suitable bearings in the standard. The outer case 1, is mounted or supported on the pipe, so that it is stationary, while the inner case 5, is mounted to rotate with the pipe. I have shown spiders 11 and 12 secured to the pipe and supporting the inner case 5. The interior of the inner case is provided with inwardly projecting ledges or plates 13, arranged longitudinally thereon, for the purpose hereinafter set forth.

The shaft or pipe 10 is hollow and is provided with a series of projections 14, projecting from the periphery thereof and these are preferably made hollow and are screwed into the pipe, having caps 15 at their ends, so that they will become thoroughly heated and can better transmit and distribute the heat through the mass of the grain. Connected to the pipe 10 is a steam-pipe 16, having a suitable valve 17, and this pipe is connected by a proper joint which will allow the pipe 10 to rotate, and still maintain a steam-tight connection. The opposite end of the shaft 10 is provided with a discharge pipe 18, having a suitable cock 19, provided with a similar joint, to permit rotation of the shaft. The space between the inner and outer cases is also subjected to a high degree of heat, and while this may be accomplished by various means, I have shown a steam pipe 20, entering the space and preferably formed into a coil 21 and having a suitable exit 22, and in connection with this pipe I may use a hot air pipe 23, having an exit 24, and while I generally prefer to use combined steam and hot air, it is evident that the objects of my invention could be accomplished to a greater or less degree, by the use of either; the essential feature being to provide an external heat to the interior case 5, which together with the heat from the steam pipe or shaft 10, will be able to produce the proper temperature to secure the complete and thorough roasting of the grain.

Suitable means are provided for rotating the shaft or pipe 10, and I have shown a sprocket-wheel 25, so that a continual rotation of the pipe and its connected agitators may be readily maintained.

The discharge chute 7, is preferably provided with a regulating valve 26, and is extended to form a guide 27, for delivering the grain into the cooler 30. The upper portion of the chute 7 is provided with a relief discharge, shown in the shape of a pipe 28, with a suitable valve 29, to allow any moisture or gases driven out of the grain, to escape to the atmosphere. While this cooler may be variously constructed, I have shown it as made of a cylinder of wire-gauze supported by spiders 31, mounted on a rotating shaft 32, which shaft is also mounted in suitable bearings in the standards 8 and 9 and provided with means for rotating, as a sprocket-wheel 33. Connected to one end of this shaft is some suitable means for supplying it with cold air as a blower 34, the shaft being connected by a collar to permit of its rotation and the shaft is perforated to permit the air to pass freely therefrom through the grain to cool the same, and thence it passes to the exit at the end of the pipe, which may be provided with a suitable regulating valve 35. The cooler is preferably inclosed in a case 36, which may be of wood or other suitable material and serves to retain the air in the cooler, and at the same time as a receptacle for any dust or dirt which may pass through the perforated cylinder, and the end of the case is formed with a discharge chute 37.

Such being the general construction and arrangement of the apparatus, its operation will be evident, and it will be seen that the hopper being provided with a suitable quantity of grain, its admission to the inner cylinder is controlled and regulated by the valve 4, and I find it preferable to keep the hopper supplied with a quantity of grain all the time, to prevent the hot air of the inner case from escaping through the hopper. As the grain descends into the rotating inner case, it is lifted by the inwardly projecting ledges or plates, and carried upward, more or less, and allowed to fall upon the hot pipe or shaft, and its projections, so that every particle of the grain is exposed sooner or later to the proper temperature to become thoroughly roasted. The projections also aid in distributing and applying the heat in the larger masses of grain, which naturally tend to the lower portions of the inner case, and they further aid in mixing and distributing the grain, and the case is preferably placed at a slight incline to cause the grain to pass therethrough. In this way, the case being subjected to the external heat from the pipes 21 or 23, and to the heat from the steam pipe 10 and its projections, I am enabled to maintain a substantially even degree of temperature throughout the case, so that the grain will be evenly and thoroughly roasted before it is delivered into the chute 7, and I have found it preferable to rotate the case at a comparatively slow speed, just sufficient to carry the grain upward and cause it to be thoroughly distributed and exposed to the heating surfaces.

The regulating valve or gate 26, controls the admission of the grain to the cooler. I find it preferable to maintain a considerable quantity of grain above the gate, to prevent the passage of hot air into the cooler. As the grain passes to the cooler, which is likewise rotated, preferably at a slow speed, the cool air permeates the mass of grain, and cools the same. In some instances, it is preferable to provide the inner surface of the cooler with ledges or similar devices, which will assist in distributing the heated grain, so that the cool air can circulate more freely through it; but even without the use of this, the grain will be distributed to a greater or less extent by the rotating cooler. The dust passes through the perforations in the cooler, and in order to aid in maintaining a pressure of air in the cooler, I use the stop 40, in the pipe 32, so that the air will enter the cooler through the openings in the main body thereof, and the warm air is driven out through the perforations in the portion 41 of the pipe beyond the stop, and thence passes through the discharge to the atmosphere. The air is forced into the pipe 32 by the fan or blower 34; and the stop 40 in said pipe 32 checks the force of the air blast and forces the air through the perforations in the body of the rotating cooler, which latter in revolving agitates the grain and allows the air to circulate through the grain which becomes cooled thereby. The pressure is kept up by the blower causing such air as has previously entered the cooler to find an exit, and the perforations 41 arranged beyond the stop 40, being the only exit, the air that has become heated by contact with the grain will pass out through said perforations 41. In this way, it will be seen that the grain or groats are treated by my process in such a manner that all moisture or volatile matter are driven off, while the starchy matter is subjected to such a degree of heat that it is changed into dextrine, and the germs which may be contained in the groats are destroyed, so that the product is delivered from the apparatus in a thoroughly roasted condition, with its substance partially converted into a food product, requiring but slight subsequent cooking to thoroughly convert the substance into the most healthful and nutritious condition.

What I claim is—

1. In an apparatus for treating cereals as hereinbefore described, the combination of the upper stationary case having an inlet for hot air or steam, the chamber rotating within said case, a valve controlled hopper or chute passing through said case and leading to said rotating chamber, the hollow shaft connecting with a steam supply and revolving with the chamber, the lower stationary case, the hollow perforated shaft connecting with a cold air supply, the gauze cylinder rotating with said perforated shaft, and a valve controlled chute connecting the upper rotating chamber with said gauze cylinder, as set forth.

2. In an apparatus for treating cereals as hereinbefore described, the combination of the stationary upper inclined case having an inlet for hot air or steam, the chamber rotating within said case, a valve controlled hopper or chute passing through said case and leading to said rotating chamber, the hollow revolving shaft connecting with a steam supply and provided with hollow projections, the lower stationary case inclining in an opposite direction to the upper, the hollow perforated shaft connecting with a cold air supply and provided with the stop 40, the gauze cylinder rotating with said perforated shaft, and a valve controlled chute connecting the upper rotating cylinder with said gauze cylinder, as set forth.

In testimony whereof I have signed my name to this specification in the presence of two subscribing witnesses.

WILLIAM ONDERDONK.

Witnesses:
F. L. FREEMAN,
G. P. KRAMER.